Patented Dec. 23, 1941

2,267,077

UNITED STATES PATENT OFFICE 2,267,077

RECOVERY OF PHOSPHORUS FROM SLUDGE

George W. Burke, Westfield, N. J., assignor to The American Agricultural Chemical Company, Newark, N. J., a corporation of Delaware No Drawing. Application June 13, 1939,
Serial No. 278,861

4 Claims. (Cl. 23—223)

This invention relates to a novel process useful in the production and recovery of phosphorus; and, more particularly, it relates to improvements in methods of treating and handling phosphorous sludge formed during the commercial production of phosphorus by smelting phosphate rock, and to improved methods for the recovery of phosphorus from such sludge.

In the commercial production of elemental phosphorus from phosphate rock, by reduction of the rock with coke or other carbonaceous reducing agent in the presence of silica, as in an electric phosphorous smelting furnace, the resulting phosphorous vapor usually carries with it more or less foreign matter, such as particles of rock, sand, and reducing agent. The result is that when the phosphorous vapor is condensed and collected under water, in order to recover the phosphorus, some of the product, upon removal from the condenser, is found to be of the character of a sludge (commonly called phosphorous "mud"), containing various concentrations of phosphorus, red and yellow, as well as the abovementioned impurities and water.

A relatively large part of this phosphorous "mud" may be chemical as well as physical in origin; that is to say, when silicon fluoride is carried over from the furnace to the condenser it reacts with water and sodium chloride in the condenser to precipitate silica and sodium silico fluoride. This, together with red phosphorus in a finely divided state, may represent a substantial percentage of the total quantity of the phosphorous mud.

The reduced phosphorus recovered and removed from the condensation system may be of as high as 99.50% purity, while the phosphorous-bearing "mud" or sludge usually forms a separate layer which floats on top of the relatively pure elemental phosphorus. The elemental phosphorus may then be drawn off or otherwise separated from the "mud."

Separation and recovery of the phosphorus contained in the sludge from the impurities which form the balance of the sludge has been attempted by various methods, among which have been filtration and distillation.

Theoretically, distillation of the wet sludge is the most promising method; but, practically, it has never, so far as I have been able to ascertain, proven successful, since substantially complete recovery of the phosphorus has not been possible, on a commercial scale, and the removal of the residue from the still is troublesome and dangerous, chiefly by reason of the fire hazard.

I have accordingly been led to make my present invention, which has for an object the provision of an improved process of treating or handling the phosphorous sludge or "mud," by a series of operations as a result of which substantially all the elemental or uncombined phosphorus, yellow and red, contained in the "mud," can be recovered in a simple and economical manner.

Another object of my invention is to provide a method of treatment or handling of the phosphorous sludge whereby a substantial part of any combined phosphorus contained in the sludge, as in any rock particles contained therein, can be recovered in elemental form.

To these and other ends, my invention comprises the novel features and steps hereinafter described and claimed.

In carrying out my invention, in what is at present the preferred manner, the phosphorous sludge or "mud" is first formed into firm, hard cakes, cylinders or briquettes, by mechanical compression, as in a hydraulic press. Enough of the water in the sludge is thus squeezed out of it to bring the water content down from, say, about 50 per cent. of the weight of the sludge to not more than about 20 per cent., but preferably not more than about 15 or 16 per cent. or even less; a water content as low as about 10% being sometimes suitable, and desirable.

I have found that in order to produce cakes, cylinders or briquettes of sludge, which are reasonably and suitably low in water content, and safe and easy to handle, a pressure of about 3000 pounds per square inch is usually sufficient, when the initial water content of the sludge is not higher than about 50 per cent., to produce a hard, dense body.

The sludge may be compressed "hot" or "cold"; that is, when "hot," with the free phosphorus in the molten state; or, when "cold," the sludge may be compressed after it has cooled far enough (preferably to room or climatic temperature or below) to solidify the phosphorus. In general, however, I have observed that the cooler the sludge when compressed, the better, so long as its water content is not frozen. Hence cold compression is at present preferred, since the compressing operation is more easily performed and the resulting cold cakes, cylinders or briquettes are less likely to take fire upon exposure to the air; and if subjected promptly to the further treatment to be described, they need not, ordinarily, be kept under water. On the other hand, the compression of hot sludge must usually be effected under water, and the resulting cakes must be kept under water until they have cooled to room temperature or below.

In any case, the compression should be high enough to produce a cake which is sufficiently dense to be stored in or under water, without substantially absorbing the latter or falling apart.

Any particles of phosphate rock (largely tricalcium phosphate) which may be contained in the sludge, and hence in the compressed cakes, are preferably passed through a suitable smelting operation in order to reduce their phosphate content to elemental phosphorus. To effect this reaction, silica and coke should be present. If the compressed cakes are charged back into the original smelting furnace, those constituents are normally present. It is desirable, therefore, that the cakes, cylinders or briquettes should be charged into a smelting furnace in which the proper ingredients are already present in the proper concentrations for smelting. This is most readily accomplished by charging the compressed cakes back into the original smelting furnace, preferably together with some fresh charge for the furnace.

Accordingly, the sludge having been formed into the cakes or other suitable forms, as already described, the cakes, cylinders or briquettes, as the case may be, are charged into a suitable smelting furnace, preferably electric, and suitably the original smelting furnace; and are there heated to at least the temperature at which any residual combined phosphorus, such as unsmelted phosphate rock or other phosphate, is reduced to the elemental vapor form and passes to the condenser. In the course of this treatment any phosphorus which was already in elemental form is vaporized and can then be recovered by condensation in the condenser in the usual manner, together with the newly-reduced phosphorus.

In the furnace the cakes may crumble, due to the evolution and escape of phosphorous vapor, but that process is not ordinarily energetic, and practically no particles are projected over into the condenser. Accordingly the phosphorus when recovered is almost wholly free from the solid impurities originally present in the cakes. The impurities are converted into slag which is drawn off periodically.

To prevent any fines that may be contained in the cakes from being carried over, it is preferable to allow the furnace burden to burn below the normal charge when a batch of cakes is charged in, and then cover the cakes with new furnace burden which largely prevents any carry-over of fume dust from the cakes. The residue thus works down into the reaction zone with the burden, where it passes through the smelting reaction.

As a specific illustrative example of the process as carried out in what is now the preferred way, the "mud" had an initial water content of between 36 and 48 per cent.; yellow phosphorus, 34 to 40 per cent.; benzene insoluble material, 10 to 20 per cent.; undetermined matter, 2 to 6 per cent.

The benzene insoluble materials may vary in composition, but ordinarily consist mostly of silico-fluorides and phosphates, red phosphorus, silica and coke.

Mud according to the foregoing analysis was compressed in a hydraulic press, under a pressure of the order of about 3000 pounds per square inch, into cylindrical cakes 5 inches in diameter and 8 inches long, of an average weight of about 8 pounds and of about the following percentage composition: water: 17; yellow phosphorus: 60; benzene ($C_6H_6$) insoluble: 21; undetermined: 2.

These cakes were charged into an electric phosphorous smelting furnace producing phosphorus and operating on the usual feed of phosphate rock, sand and coke. The additional phosphorous recovery from the cakes thus charged was found to be about 90% of that fed into the furnace in the form of the cakes. The impurities in the cakes were removed from the furnace in the regular furnace slag without interruption of the regular furnace operation.

The process herein described, and the specific illustrative example given above, are the best embodiments of my invention now known to me, but it is to be understood that my invention is not necessarily or specifically limited thereto, but may be carried out in other ways, without departure from its spirit, within the scope of the following claims.

I claim:

1. In a method of producing phosphorus by smelting phosphate rock with a reducing agent in the presence of silica and thereafter condensing, collecting and recovering the resulting phosphorous vapor under water and separating accumulated phosphorous-bearing sludge from the relatively pure elemental phosphorus resulting from condensation of the phosphorous vapor: the improvements which comprise compressing said sludge per se, by the application of substantial pressure, into firm, hard and dense cakes, cylinders or briquettes of highly-compressed material and subjecting the same to heat sufficient to volatilize phosphorus contained therein.

2. In a method of producing phosphorus by smelting phosphate rock with a reducing agent in the presence of silica and thereafter condensing, collecting and recovering the resulting phosphorous vapor under water and separating accumulated phosphorous-bearing sludge from the relatively pure elemental phosphorus resulting from condensation of the phosphorous vapor: the improvements which comprise subjecting said sludge per se to substantial compression, to form it into firm, hard and dense cakes, cylinders or briquettes of highly compressed material; subjecting the latter as thus compressed and in unbroken form to further smelting in the presence of a reducing agent and silica at a temperature sufficient to smelt combined phosphorus and volatilize elemental phosphorus contained therein; and condensing, collecting and recovering resulting phosphorous vapor.

3. In a method of producing phosphorus by smelting phosphate rock with a reducing agent in the presence of silica and thereafter condensing, collecting and recovering the resulting phosphorous vapor under water and separating accumulated phosphorous-bearing sludge from the relatively pure elemental phosphorus resulting from condensation of the phosphorous vapor: the improvements which comprise compressing said sludge per se, by application of substantial force, into firm, hard and dense cakes, cylinders or briquettes of highly-compressed material, and subjecting the latter as thus compressed and in unbroken form to a further smelting operation together with a fresh charge of phosphate rock in the presence of a reducing agent and silica and at a temperature sufficient to reduce combined phosphorus and volatilize elemental phosphorus contained in said cakes, cylinders or briquettes; and condensing, collecting and recovering phosphorous vapors resulting from such smelting and volatilization.

4. In a method of producing phosphorus by smelting phosphate rock with a reducing agent in the presence of silica and thereafter condensing, collecting and recovering the resulting phosphorous vapor under water and separating accumulated phosphorous-bearing sludge from the relatively pure elemental phosphorus resulting from condensation of the phosphorous vapor: the improvements which comprise compressing said sludge per se, by application of substantial force, into firm, hard and dense cakes, cylinders or briquettes of highly-compressed material having a water content of not more than about 20 per cent. of its weight, and subjecting the material as thus compressed and in unbroken form to a further smelting operation together with a fresh charge of phosphate rock in the presence of a reducing agent and silica and at a temperature sufficient to reduce combined phosphorus and volatilize elemental phosphorous contained in said cakes, cylinders or briquettes; and condensing, collecting and recovering phosphorous vapors resulting from such smelting and volatilization.

GEORGE W. BURKE.